No. 835,212. PATENTED NOV. 6, 1906.
F. T. BLYNT.
PIE PAN.
APPLICATION FILED SEPT. 27, 1905.
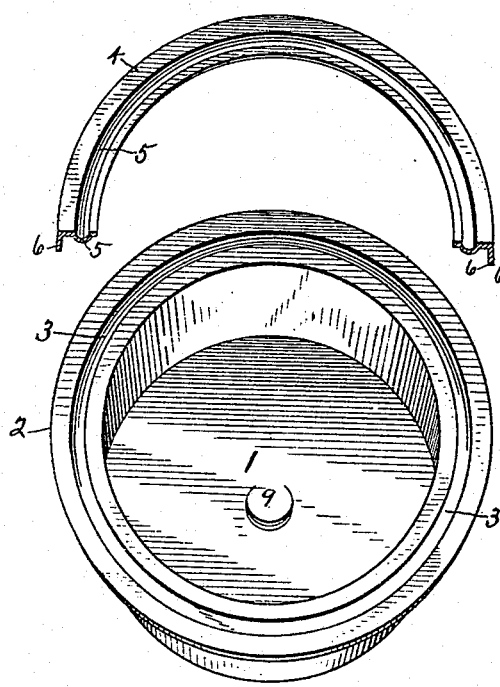
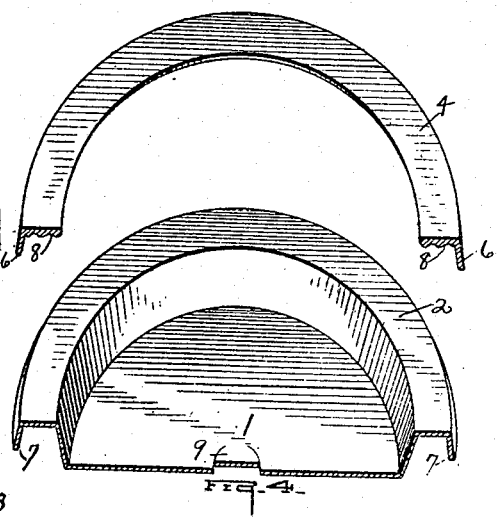
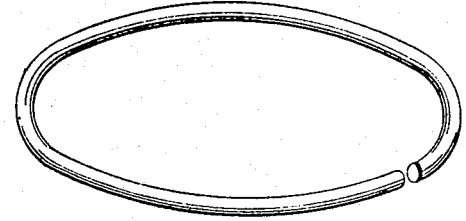
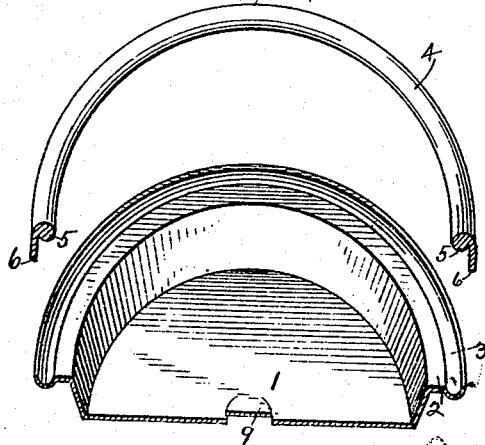
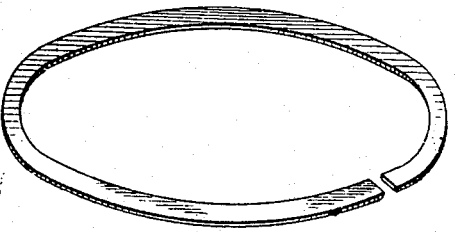
WITNESSES:
INVENTOR
Florence T. Blynt
by
H. W. Stevenson
ATTORNEY

UNITED STATES PATENT OFFICE.

FLORENCE T. BLYNT, OF TOLEDO, OHIO.

PIE-PAN.

No. 835,212.  Specification of Letters Patent.  Patented Nov. 6, 1906.

Application filed September 27, 1905. Serial No. 280,271.

*To all whom it may concern:*

Be it known that I, FLORENCE T. BLYNT, a citizen of the United States, residing at Toledo, in the county of Lucas and State of Ohio, have invented certain new and useful Improvements in Pie-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new, novel, and useful improvement in pie-pans, and has for its object a means whereby the juices or contents of the pie will be prevented from running over the edge while baking and by so doing preserve the fruit, also avoid burning in the oven and consequent odor arising from the same.

In the accompanying drawings, forming a part of this specification, I have shown several views illustrating my preferred and modified forms of pie-pan, Figure 1 being a perspective view of a pan and section of a removable ring adapted to fit down on the rim of the same. Fig. 2 is a sectional view of a modified form of pan and ring. Fig. 3 is a similar view of a second modification. Fig. 4 is a round circular ring adapted to fit in the groove formed in the rim of the pan. Fig. 5 is a flat circular ring for the same purpose, and Fig. 6 is a sectional view of an angled circular ring intended for the same purpose as the preceding two.

Throughout the drawings numerals of reference designate like parts, 1 being the body portion of the pan, and 2 an annular rim or flange formed on the top thereof. Formed in the center of this flange is an annular groove 3, as shown in Fig. 1, or formed near the outer rim, as shown in Fig. 2. This groove can be of any desired form, such as round, square, or V-shaped.

4 is a pressing and forming ring adapted to fit down on the flange 2 and has an annular beading on the under side thereof adapted to register with the groove 3. Formed integral with this ring is a flange 6, which is intended to fit on the outside of the flange 2 and also act as a shearing method of cutting and trimming off the dough prior to baking.

In Fig. 3 I have shown a pie-pan without the annular groove formed in the flange 2, but having a downwardly-extending portion 7, bent on an angle. In this form of pan the compression-ring 4 is also provided with a cutting-flange 6, and on the under side of the ring is formed corrugations or designed work 8.

Figs. 4, 5, and 6 illustrate three different forms of pressing-rings that may be utilized to register in correspondingly-shaped grooves.

In the use of my improved pan the dough is first rolled out, as commonly known, then filled in the pan and extending over the flange 2. This layer of dough is next covered with fruit or other ingredient and a layer of dough placed on top, leaving a portion extending over the rim 2. The compression-ring 4 is next pressed down onto its seat, the top layer of dough being forced into the groove 3 and the two layers welded together. As the ring is forced into its seat the flange 6 will cut off the dough and trim the pie, leaving a clean edge. This ring is left in this position until after the pie is baked and by so doing prevents the juice from the pie escaping out of the pan and running over into the oven.

In the form of pan shown in Fig. 3 the same process of preparing the dough and of filling the pan is adhered to; but instead of having a beading to register in a groove I have provided a crimping device 8, formed on the under side of the ring 4, which when pressed on the two layers of dough will also weld the same together and accomplish the same object as provided in the other two forms.

By using the different forms of compressing-rings as shown in Figs. 4, 5, and 6 a variety of edging can be had on the pie.

By using a pie-pan of the construction described herewith the well-known defects of the ordinary pan will be eliminated, such as the wasting of the best part of the fruit or contents, softening of the edge of the pie, which prevents keeping, the burning of juices in the oven, and consequent odor arising from the same.

In the bottom of the pan I provide a vent 9, which affords a means of escape for the steam or gases that form between the bottom crust and pan during the process of baking, thus preventing heaving up of the pie.

Having thus fully shown and described my invention, what I claim as new, and desire to secure by Letters Patent, is—

In a pie-pan of the character described the combination, with the body portion, of an annular flat rim or flange formed around the top of the pan; an annular groove formed in said rim; a pressing-ring adapted to fit down on said rim and engage in the annular groove; and a cutting-flange formed on the outside of said ring; as and for the purpose set forth.

In testimony whereof I affix my signature in presence of two witnesses.

FLORENCE T. BLYNT.

Witnesses:
  ORION W. NELSON,
  A. L. HENSCHEL.